United States Patent [19]

Shinjo et al.

[11] Patent Number: 4,962,156

[45] Date of Patent: Oct. 9, 1990

[54] WATER- AND OIL-REPELLENT COMPOSITION

[75] Inventors: Masayoshi Shinjo, Settsu; Sumiko Okamoto, Toyonaka; Yasuko Katakura, Yamatokooriyama; Seiji Takubo, Settsu, all of Japan

[73] Assignee: Daikin Industries, Ltd., Osaka, Japan

[21] Appl. No.: 393,816

[22] Filed: Aug. 15, 1989

Related U.S. Application Data

[63] Continuation of Ser. No. 130,475, Dec. 9, 1987, abandoned.

[30] Foreign Application Priority Data

Dec. 11, 1986 [JP] Japan ................................ 61-295290

[51] Int. Cl.$^5$ .............................................. C08F 8/00
[52] U.S. Cl. ..................................... 525/100; 525/101; 525/479; 524/198; 524/199; 524/89; 524/91
[58] Field of Search ....................... 525/101, 100, 479; 524/198, 199, 89, 91

[56] References Cited

U.S. PATENT DOCUMENTS 3,714,287  1/1973  Campbell et al. .................... 525/100
4,617,057  10/1986  Plueddemann ......................... 106/2
4,702,990  10/1987  Tanaka et al. ....................... 430/197

*Primary Examiner*—Melvyn I. Marquis
*Attorney, Agent, or Firm*—Larson and Taylor

[57] ABSTRACT

Disclosed is A water- and oil-repellent composition comprising (A) at least one species selected from the group consisting of a homopolymer and a copolymer of perfluoroalkyl group-containing acrylate, a homopolymer and a copolymer of methacrylate, a copolymer of the same and a monomer copolymerizable therewith and a perfluoroalkyl group-containing urethane compound, and (B) a ladder polymer of organosilsesquioxane.

7 Claims, No Drawings

WATER- AND OIL-REPELLENT COMPOSITION

This application is a continuation of application Ser. No. 130,475, filed Dec. 9, 1987, now abandoned.

FIELD OF THE INVENTION

The present invention relates to fluorine-containing water- and oil-repellent compositions.

BACKGROUND OF THE INVENTION

Homopolymers of fluorine-containing acrylate or methacrylate, copolymers of the same and a monomer copolymerizable therewith or like fluorine-containing compounds have been used as a textile treating agent to give a water- and oil-repellency to textile materials. However, these fluorine-containing compounds can not afford a durable water- and oil-repellency to textile materials nor impart them a soil resistance.

Improved textile treating agents have been proposed to overcome the above drawbacks. These textile treating agents include, for example, a soil resistant composition comprising a fluorine-containing urethane compound (Unexamined Japanese Patent Publication No. 74000/1979), a soil resistant composition comprising a polyfunctional isocyanate compound and a fluorine-containing compound (Unexamined Japanese Patent Publication No. 33315/1984), a water- and oil-repellent composition comprising a fluorine-containing urethane compound and a functional group-containing organopoly-siloxane (Unexamined Japanese Patent Publication No. 81278/1985), etc. Such compositions can give a good soil resistance and a durable water- and oil-repellency to textile materials.

However, it is now desired to develop water- and oil-repellent compositions having further improved properties in view of the current tendency to demand textile materials of higher quality.

SUMMARY OF THE INVENTION

It is an object of the present invention to provide a water- and oil-repellent composition capable of giving a good soil resistance and an excellent water- and oil-repellency to textile materials.

It is another object of the present invention to provide a water- and oil-repellent composition capable of giving a durable water- and oil-repellency to textile materials.

Other objects and features of the present invention will become apparent from the following description.

The present invention provides a water- and oil-repellent composition comprising (A) at least one species selected from the group consisting of a homopolymer and copolymer of perfluoroalkyl group-containing acrylate, homopolymer and copolymer of perfluoroalkyl group-containing methacrylate, a copolymer of the same and a monomer copolymerizable therewith and a perfluoroalkyl group-containing urethane compound, and (B) a ladder polymer of organosilsesquioxane.

We found that a water- and oil-repellent composition which can give a good soil resistance and an excellent water- and oil-repellency to textile materials and which can give a durable water- and oil-repellency to textile materials can be prepared by adding a ladder polymer of organosilsesquioxane to a fluorine compound containing perfluoroalkyl group. The present invention has been accomplished based on this novel finding.

DETAILED DESCRIPTION OF THE INVENTION

I. The component (A) of the water- and oil-repellent composition according to the present invention will be described below in detail.

(i) Homopolymers and copolymers of perfluoroalkyl group-containing acrylate or methacrylate represented by the formulas (1) and (2) shown below, and copolymers of at least one of these monomers and, at least one of other monomers copolymerizable therewith.

$$R_fR^2OCOCR^1=CH_2 \quad (1)$$

$$R_fSO_2NR^3R^4OCOR^1=CH_2 \quad (2)$$

wherein $R_f$ is perfluoroalky group having 4 to 20 carbon atoms, $R^1$ is hydrogen atom or methyl group, $R_2$ is alkylene group having 1 to 10 carbon atoms or a group $-CH_2CH(OR^3)CH_2-$, $R^3$ is hydrogen atom or alkyl group having 1 to 10 carbon atoms, $R^4$ is alkylene group having 1 to 10 carbon atoms.

Examples of fluorine-containing compounds of the formulas (1) and (2) are as follows.

$$CF_3(CF_2)_4CH_2OCOC(CH_3)=CH_2$$

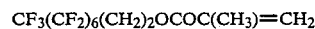

$$CF_3(CF_2)_6(CH_2)_2OCOC(CH_3)=CH_2$$

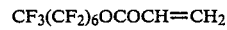

$$CF_3(CF_2)_6OCOCH=CH_2$$

$$CH_3(CF_2)_7CH_2CH_2OCOCH=CH_2$$

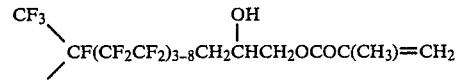

$$\begin{array}{c} CF_3 \\ \phantom{CF_3}\diagdown \\ \phantom{CF_3}\phantom{XX}CF(CF_2CF_2)_{3-8}CH_2\overset{OH}{\underset{|}{C}}HCH_2OCOC(CH_3)=CH_2 \\ \phantom{CF_3}\diagup \\ CF_3 \end{array}$$

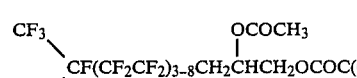

$$\begin{array}{c} CF_3 \\ \phantom{CF_3}\diagdown \\ \phantom{CF_3}\phantom{XX}CF(CF_2CF_2)_{3-8}CH_2\overset{OCOCH_3}{\underset{|}{C}}HCH_2OCOC(CH_3)=CH_2 \\ \phantom{CF_3}\diagup \\ CF_3 \end{array}$$

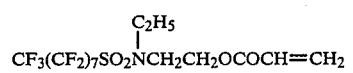

$$CF_3(CF_2)_7SO_2\overset{C_2H_5}{\underset{|}{N}}CH_2CH_2OCOCH=CH_2$$

$$CF_3CF_2(CF_2CF_2)_{2-8}(CH_2CH_2)_2OCOCH=CH_2$$

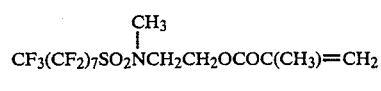

$$CF_3(CF_2)_7SO_2\overset{CH_3}{\underset{|}{N}}CH_2CH_2OCOC(CH_3)=CH_2$$

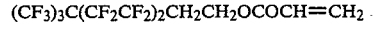

$$(CF_3)_3C(CF_2CF_2)_2CH_2CH_2OCOCH=CH_2$$

Examples of monomers copolymerizable with the above acrylates and methacrylates are methyl acrylate and methacrylate, ethyl acrylate and methacrylate, propyl acrylate and methacrylate, butyl acrylate and methacrylate, cyclohexyl acrylate and methacrylate, benzyl acrylate and methacrylate, octyl acrylate and methacrylate, 2-ethylhexyl acrylate and methacrylate, lauryl acrylate and methacrylate, tridecyl acrylate and methacrylate, cetyl acrylate and methacrylate, stearyl acrylate and methacrylate, methyoxyethyl acrylate and methacrylate, ethoxyethyl acrylate and methacrylate, butoxyethyl acrylate and methacrylate, 2-hydroxyethyl acrylate and methacrylate, 2-hydroxy-3-chloropropyl acrylate and methacrylate, diethylaminoethyl acrylate and methacrylate, glycidyl acrylate and methacrylate, tetrahydrofurfuryl acrylate and methacrylate, methoxypolyethylene glycol, acrylic amide, methacrylic amide, vinyl ester of monovalent organic acid having 2 to 18 carbon atoms, vinyl ether of alkyl having 1 to 18 carbon atoms, vinyl chloride, vinylidene chloride, acrylonitrile, methacrylonitrile, acryloxypropyltri-methoxysilane, methacryloxypropyltri-methoxysilane, etc.

Homopolymers or copolymers of acrylate or methacrylate containing perfluoroalkyl group, or copolymers of the same and monomers copolymerizable therewith can be prepared by any of conventional polymerization methods under polymerization reaction conditions suitably determined. Examples of useful polymerization methods are solution polymerization method, bulk or mass polymerization method, radiation polymerization method and the like. According to solution polymerization method, for example, acrylate or methacrylate containing perfluoroalkyl group, or a mixture of the same and monomer(s) copolymerizable therewith is dissolved in a suitable solvent or is dispersed in water with an emulsifying agent, and then a peroxide, azo compound, ionizing radiation or like polymerization-initiating source is made to act on the solution or dispersion, giving a polymer. Useful organic solvents are not specifically limited and include, for example, halogenated hydrocarbon type solvents such as methyl chloroform, tetrachlorodifluoro-ethane, 1,1,2-trichloro-1,2,2-trifluoroethane, trichloroethylene, tetrachloroethylene and the like. The polymer thus obtained has an average molecular weight of about 2,000 to about 60,000. In performing an addition polymerization of acrylate or methacrylate containing perfluoroalkyl group with a monomer copolymerizable therewith, the former is used preferably in an amount of 80% by weight or more.

(ii) Perfluoroalkyl group-containing urethane compounds

Examples of perfluoroalkyl group-containing urethane compounds are those represented by the following formulas (3) to (6).

$$R_fXOCNHYNHCZ \quad (3)$$
(with two C=O)

$$(R_fXOCNHYNHC)_2W \quad (4)$$

$$R_fXOCNHYNHCNHYNHCOXR_f \quad (5)$$

$$(R_fXOCNH)_{m'}R^5(NHCOR^6)_{n'-m'} \quad (6)$$

In the above formulas, $R_f$ is as defined above, X is —$CH_2CH(A)C_jH_{2j}$—, —$C_kH_{2k}$— or —$SO_2N(R^7)C_lH_{2l}$— (wherein A is hydrogen, lower alkyl (e.g. $C_{1-5}$), hydroxyl or lower alkyl(e.g. $C_{2-6}$)-carbonyloxy, j is an integer of 0 to 4, k and are an integer of 1 to 4 and $R^7$ is hydrogen or lower alkyl), Y is a bivalent organic group, Z is a monovalent organic group and W is a bivalent organic group. $R^5$ in the formula (6) is an organic group having a valence of n, $R^6$ is lower alkyl, n' is an integer of 3 to 10, and m' is an integer in the range of $n' \geq m' \geq 1$.

Examples of bivalent organic groups represented by Y in the urethane compounds of the formulas (3) to (6) are as follows.

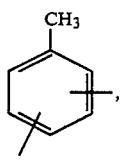

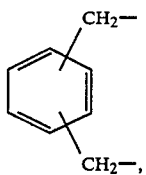

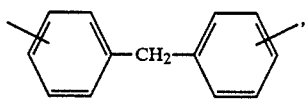

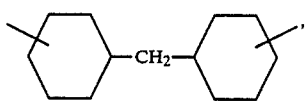

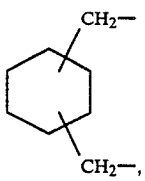

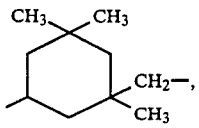

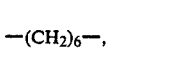

—(CH$_2$)$_6$—,

Examples of monovalent organic groups represented by Z are as follows.

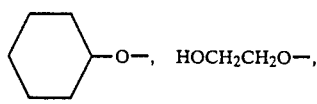

$CH_3COCH_2CH(CH_3)O$—,   $CH_3COCH_2C(CH_3)_2O$—,

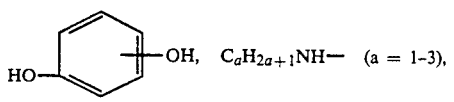

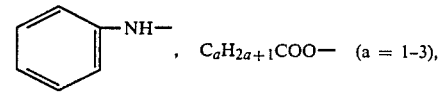

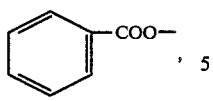

Examples of bivalent organic groups represented by W are as follows.

—O(CH$_2$)$_b$O—  (b = 2–6),

—O(CH$_2$)$_b$NH—  (b = 2–6),

—NH(CH$_2$)$_b$NH—  (b = 2–6),

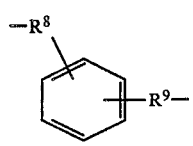

wherein $R^8$ and $R^9$ are the same or different and each represent oxygen, imino or oxyalkyl having 1 to 6 carbon atoms (oxygen not being linked directly to the benzene nucleus) or iminoalkyl (imino not being linked directly to the benzene nucleus),

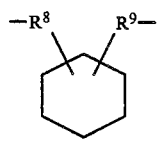

wherein $R^8$ and $R^9$ are as defined above, —O(CH$_2$CH$_2$O)$_{b'}$-($b'$=2–100), etc.

Examples of organic groups represented by $R^5$ and having a valence of n are as given below.

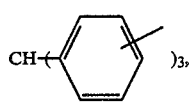

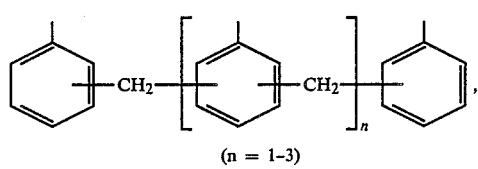

(n = 1–3)

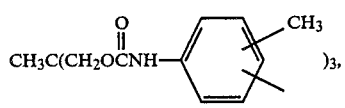

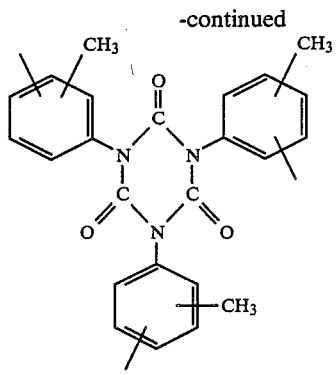

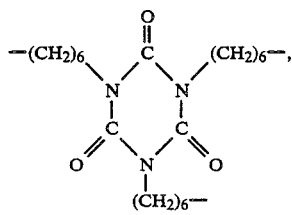

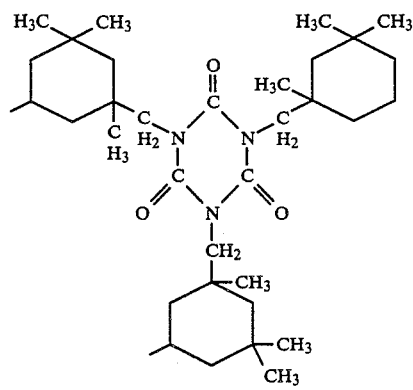

The fluorine-containing urethane compounds of the formulas (3) to (6) are all known compounds, for example, as disclosed in Japanese Unexamined Patent Publications Nos. 110555/1983, 111898/1983 and 31751/1984 and can be prepared by the following processes.

The fluorine-containing urethane compound of the formula (3) can be prepared by the processes described, for example, in U.S. Pat. Nos. 3,398,182 and 3,484,281. More specifically, 1 mole of fluorine-containing alcohol (R$_f$XOH) and 1 mole of diisocyanate compound (OCNYNCO) are mixed and heated in the presence or the absence of a catalyst such as triethylamine. Following this first-stage reaction, 1 mole of alcohol, amine, carboxylic acid or the like is added to the resulting reaction product

thereby giving a fluorine-containing compound. When required, the contemplated compound can be also prepared by adding 2 moles of fluorine-containing alcohol per 1 mole of diisocyanate compound. R$_f$, X, Y and Z are defined according to the structure of starting compounds used.

Useful fluorine-containing alcohols include a wide variety of those known. Examples thereof are given below.

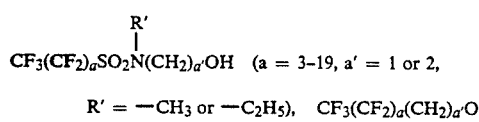

CF$_3$(CF$_2$)$_a$SO$_2$N(CH$_2$)$_{a'}$OH (a = 3–19, a' = 1 or 2,

R' = —CH$_3$ or —C$_2$H$_5$), CF$_3$(CF$_2$)$_a$(CH$_2$)$_{a'}$OH (a = 3–19, a' = 1 or 2), 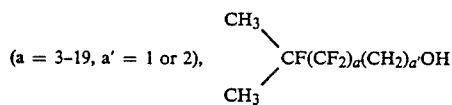

(a = 3–19, a' = 1 or 2), CF$_3$(CF$_2$)$_a$CH$_2$CHOH (a = 3–10) 

Usable as alcohols, amines or carboxylic acid compounds are a wide variety of those known and examples are:

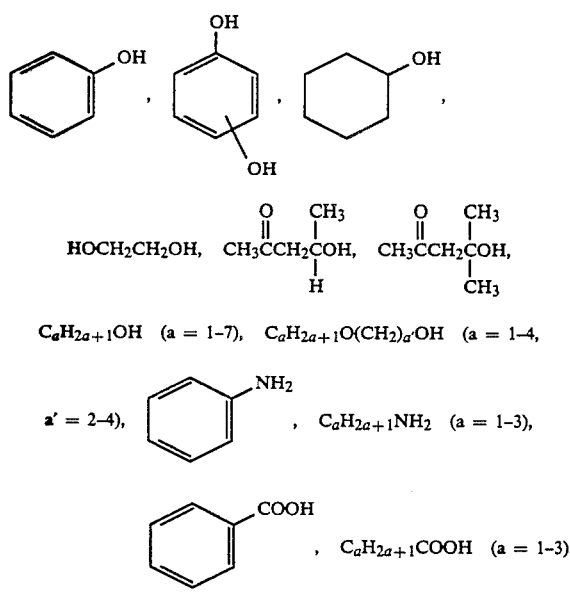

HOCH$_2$CH$_2$OH, CH$_3$CCH$_2$COH, CH$_3$CCH$_2$COH,

C$_a$H$_{2a+1}$OH (a = 1–7), C$_a$H$_{2a+1}$O(CH$_2$)$_{a'}$OH (a = 1–4, a' = 2–4), C$_a$H$_{2a+1}$NH$_2$ (a = 1–3),

C$_a$H$_{2a+1}$COOH (a = 1–3)

The residue resulting from the reaction of these compounds is the monovalent organic group represented by Z.

Useful diisocyanate compounds include a wide variety of those known, for example:

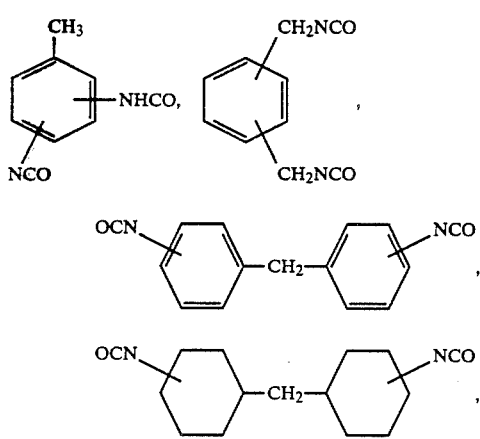

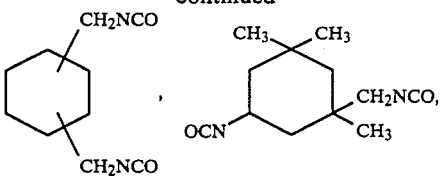

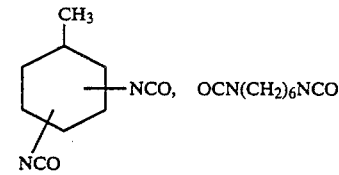

The residue from the reaction of diisocyanate compound used is the bivalent organic group represented by Y.

The fluorine-containing urethane compound of the formula (4) can be prepared, for example, by reacting a compound having two functional hydroxyl and/or amino groups with the reaction product given by the first-stage reaction in the process for preparing the compound of the formula (3). Examples of useful compounds with such groups include a wide variety of those known and can be any of them, specific examples thereof being:

HO(CH$_2$)$_b$OH   (b = 2–6),

HO(CH$_2$)$_b$NH$_2$   (b = 2–6),

H$_2$N(CH$_2$)$_b$NH$_2$   (b = 2–6),

HO(CH$_2$CH$_2$O)$_b$H   (b = 2–100),

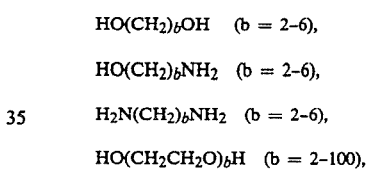

wherein R$^{10}$ and R$^{11}$ are the same or different and each represent hydroxyl, amino, or hydroxyalkyl or aminoalkyl having 1 to 6 carbon atoms.

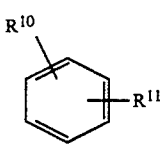

wherein R$^{10}$ and R$^{11}$ are as defined above, HO(CH$_2$CH$_2$O)$_{b'}$H(b'=2–100), etc.

The residue from the reaction of these compounds is the bivalent organic group represented by W.

The fluorine-containing compound of the formula (5) can be prepared, for example, by reacting water with the reaction product resulting from the first-stage reaction in the process for preparing the compound of the formula (3).

The fluorine-containing compound of the formula (6) can be prepared by reacting m' mole of fluorine-containing alcohol (R$_f$XOH) with 1 mole of polyisocyanate compound [R$^5$(NCO)$_{n'}$], and reacting 1 mole of the resulting reaction product represented by the formula

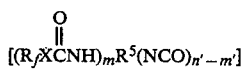

with n'-m' mole of a lower alcohol ($R^6OH$).

The examples described above as fluorine-containing alcohols are also usable in the reaction.

Useful polyisocyanate compounds include a wide range of those known and examples thereof are:

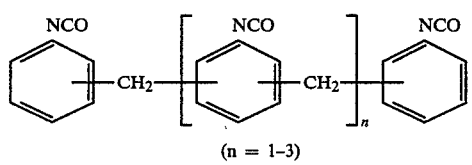

(n = 1–3)

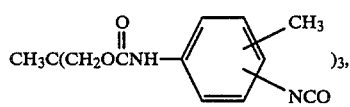

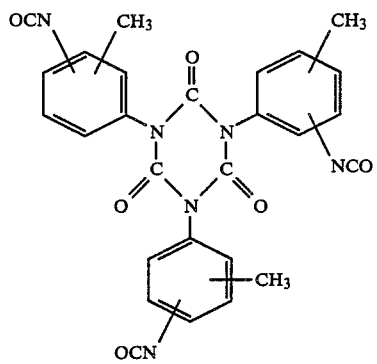

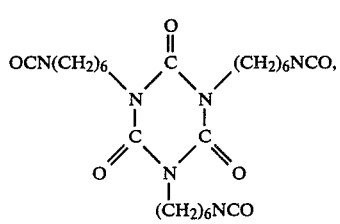

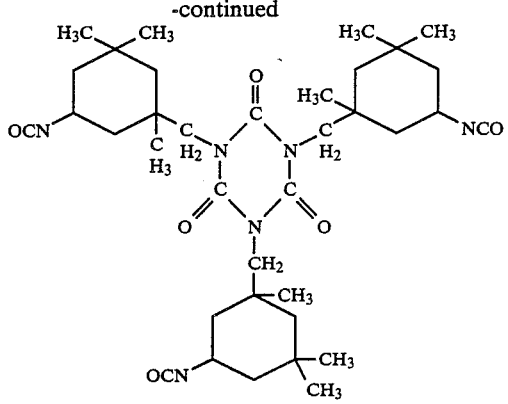

The residue remaining after removal of the isocyanate groups of these compounds is the organic group represented by $R^5$ and having a valence of n.

Examples of useful lower alcohols are methanol, ethanol, propanol, butanol, etc.

The reactions as stated above are carried out in the presence or the absence of a catalyst and usually in an organic solvent inert to isocyanate group.

II. Ladder polymer of organosilsesquioxane

The ladder polymer of organosilsesquioxane to be used in the present invention as the component (B) is an addition polymer having a regularly arranged ladder-like skeletal structure, the polymer being composed of a hypothetical monomer $R^{12}SiO_{1.5}$ (organosilsesquioxane) and being represented by the formula

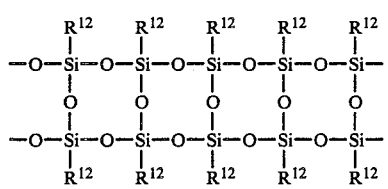
(7)

wherein $R^{12}$ is the same or different and represents methyl, phenyl or the like with the proviso that portions of oxygen atoms linking the two longer cycloxane chains may be replaced by two hydroxyl groups. The polymer is prepared by hydrolyzing at least one species selected from the group consisting of methyltrichlorosilane, phenyltrichlorosilane, methyltriethoxysilane, phenyltriethoxysilane and like trifunctional organosilanes and subjecting the hydrolysis product to condensation polymerization to attain equilibrium and when required, performing further condensation polymerization.

More strictly defined, the ladder polymer of organosilsesquioxane is represented by repeating units having the formula

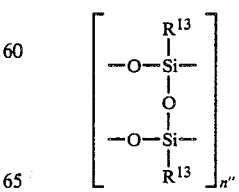

wherein $R^{13}$ is the same substituent and represents hydrogen, alkyl having 1 to 6 carbon atoms, cyclohexyl, alkenyl having 2 to 6 carbon atoms or phenyl, and n" is an integer of 2 to 6. The polymerization degree of the ladder polymer is between about 2 to about 200 units, one unit being represented by

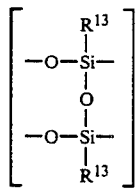

wherein less than 10% of oxygen atoms linking together the two longer cyloxane chains may be substituted with two hydroxyl groups. When the ladder polymer is a chain one, the polymer has, at the Si terminal, halogen such as Cl or the like, alkoxy having 1 to 6 carbon atoms, acetoxy or hydroxyl and at the O terminal, oxygen substituted with halogen, or alkyl having 1 to 6 carbon atoms, acetyl or hydrogen linked to oxygen in corresponding relationship with the Si terminal.

The ladder polymer of organosilsesquioxane is a known compound and can be prepared by the processes as disclosed in Encyclopedia of Polymer Science and Technology Vol. 12, pages 500–501, 1970, Japanese Examined Patent Publication No. 15989/1965, Japanese Unexamined Patent Publication No. 5826/1981, etc. However, the polymers to be used in the present invention are not limited, of course, to those prepared by the processes described therein.

Examples of organosilsesquioxane are given below.

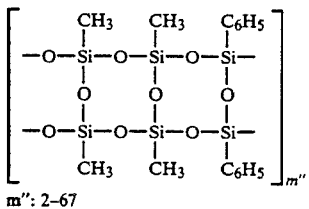

m": 2-67 wherein the ratio of methyl to phenyl is about 2:1, the groups being not invariably in the positions as shown above.

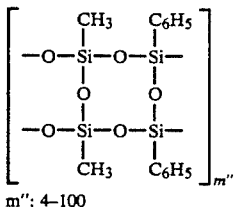

m": 4-100

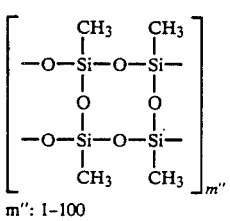

m": 1-100

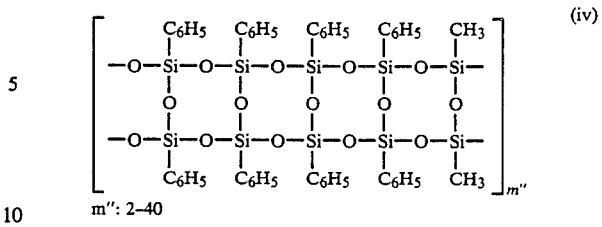

m": 2-40 wherein the ratio of methyl to phenyl is about 1:4, the groups not being invariably in the positions as shown above.

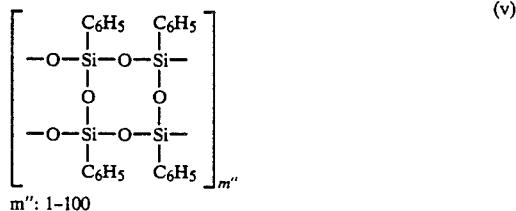

m": 1-100

The compounds of the formulas (i), (ii), (iii), (iv) and (v) are commercially available under trademarks "GR 100," "GR 150," "GR 650," "GR 908" and "GR 950," respectively (products of Owens-Illinois Co., Ltd., U.S.A.).

The weight ratio of the perfluoroalkyl group-containing compound or the polymer to the ladder polymer of organosilsesquioxane in the present invention can be suitably determined over a wide range of usually about 99.9:0.1 to about 0.1:99.9. It is particularly suitable to use these components in a weight ratio of about 30:70 to about 99.9:0.1 to produce the water- and oil-repellent composition of the invention with highly improved water- and oil-repellency and soil resistance.

The water- and oil-repellent composition of the present invention can be applied to a textile material, for example, by the following method. The water- and oil-repellent composition of the present invention is dissolved or dispersed in an organic solvent or an aqueous medium, and the solution or dispersion thus obtained is applied to a textile material by, e.g. spraying, brushing, immersion of textile materials in the solution or dispersion or like means. Examples of useful organic solvents are aromatic hydrocarbons such as benzene, toluene, xylene and the like, alcohols such as methanol, ethanol, butanol, propanol, isopropanol and the like, ketones such as acetone, methyl ethyl ketone and the like, esters such as ethyl acetate and the like, ethers such as dioxane, tetrahydrofuran, cellosolve and the like, halogenated hydrocarbons such as methyl chloroform, tetrachlorodifluoroethane, 1,1,2-trichloro-1,2,2-trifluoroethane, trichloroethylene, tetrachloroethylene and the like, nitriles such as acetonitrile and the like, dimethylformamide, metaxylenehexafluoride and the like. These organic solvents can be used singly or at least two of them are usable in mixture. In preparation of an organic solvent solution or an aqueous dispersion, the concentration of the water- and oil-repellent composition of the present invention is about 0.01 to about 40% by weight, preferably about 0.07 to about 3% by weight. The water- and oil-repellent composition can be more easily applied to textile materials if used in the form of an aerosol prepared by adding to the solution or dispersion a propellant such as dichlorodifluoromethane, monofluorotrichloroethane, dichlorotetrafluoroethane or the like.

When the polymer or the compound is used as the compound A in the present invention, condensation of the same and the ladder polymer of organosilsesquioxane before use further improves the water- and oil-repellency and soil resistance of water- and oil-repellent composition of the invention. The condensation reaction can be performed, for example, by (i) heating the water- and oil-repellent composition of the invention in the organic solvent or aqueous medium at a temperature of about 50° to about 200° C. to form a precondensate of fluorine-containing compound and ladder polymer of organosesquioxane, or (ii) conducting heat treatment at a temperature of about 40° to about 400° C. after application of water- and oil-repellent composition to textile materials. A catalyst may be added to promote condensation reaction. Examples of useful catalysts are amines such as pyridine, amine-containing silicone, triethanolamine and the like, bases such as tetramethylammonium hydroxide, melamineformaldehyde, benzyltrimethylammonium hydroxide and the like, metal salts of organic acid or inorganic acids such as phenylphosphonic acid, citric acid, formic acid, hydrochloric acid, acetic acid, nitric acid, sulfuric acid, phosphoric acid and the like.

When required, the water- and oil-repellent composition of the present invention may contain conventional additives such as antistatic agent, softening agent, lubricant moth-proofing agent, flame retardant, dyes, dyes stabilizer, etc.

The water- and oil-repellent composition of the present invention can be used in the treatment of any of usual textile materials.

The water- and oil-repellent composition of the present invention can give a good soil resistance and a durable water- and oil-repellency to any of usual textile materials.

The present invention is described below in more detail with reference to the following Examples and Comparison Examples in which all parts and percentages are by weight unless otherwise specified.

EXAMPLE 1

1. Water- and oil repellent compositions tested (a) Water- and oil-repellent compositions of the present invention Nine kinds of water- and oil-repellent compositions of the present invention were prepared from 3 kinds of fluorine-containing polymers having the composition shown below in (1) to (3), one kind of fluorine-containing compound of the formula (4) and 2 kinds of ladder polymers of organosiloxane of the formulas (5) and (6) shown below (hereinafter referred to as "PLOS") in the amounts listed below in Table 1.

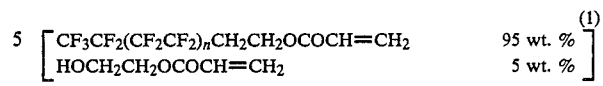

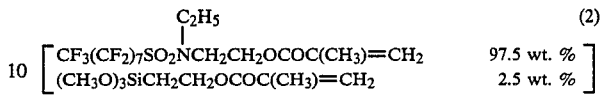

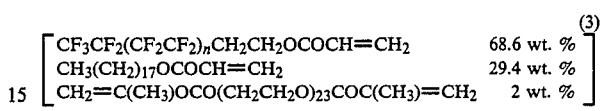

The fluorine-containing polymers described above in (1) and (3) comprises mixtures of 55 mole % of polymer wherein n=3, 28 mole % of polymer wherein n=4, 11 mole % of polymer wherein n=5, 4 mole % of polymer wherein n=6 and 1 mole % of polymer wherein n=7.

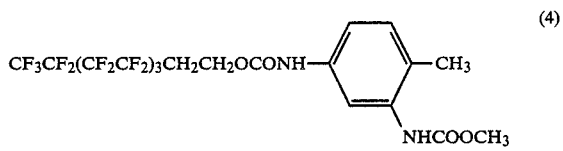

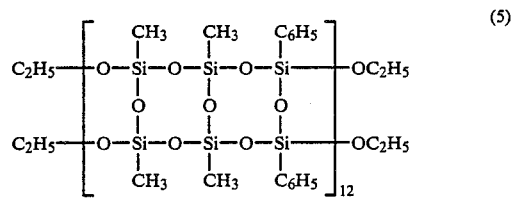

wherein the ratio of methyl to phenyl is 2:1, these groups being not invariably positioned as shown above, and 3 mole % of oxygen atoms linking together the two longer siloxane chains being substituted with two hydroxyl groups.

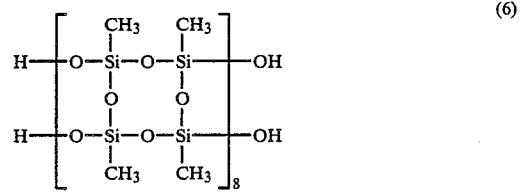

TABLE 1

| | polymer | | PLOS | | solvent | | catalyst | |
|---|---|---|---|---|---|---|---|---|
| No. | kind | amount % | kind | amount % | | % | kind | amount % |
| 1 | (1) | 70 | (5) | 30 | IPA | 5 | — | — |
| | | | | | S-3 | 95 | | |
| 2 | (2) | 70 | (5) | 30 | IPA | 5 | — | — |
| | | | | | S-3 | 95 | | |
| 3 | (3) | 70 | (5) | 30 | IPA | 5 | — | — |
| | | | | | S-3 | 95 | | |
| 4 | (2) | 70 | (5) | 30 | acetone | 5 | — | — |
| | | | | | S-3 | 90 | | |
| 5 | (3) | 70 | (6) | 30 | IPA | 5 | — | — |
| | | | | | S-3 | 95 | | |
| 6 | (1) | 90 | (5) | 10 | IPA | 5 | | |

TABLE 1-continued

| No. | polymer kind | amount % | PLOS kind | amount % | solvent | % | catalyst kind | amount % |
|---|---|---|---|---|---|---|---|---|
| 7 | (1) | 30 | (5) | 70 | S-3<br>IPA | 95<br>5 | — | — |
| 8 | (1) | 70 | (5) | 30 | S-3<br>IPA<br>S-3 | 95<br>5<br>95 | formic acid<br>methylammonium hydroxide | 0.01<br>0.01 |
| 9 | (3) | 70 | (5) | 30 | IPA<br>S-3 | 5<br>95 | formic acid<br>methylammonium hydroxide | 0.01<br>0.01 |

In Table 1, the following symbols are used as abbreviations: WOR stands for a water- and oil-repellent composition, IPA for isopropyl alcohol, S-3 for 1,1,2-trifluorotrichloro-ethane. These abbreviations appear also in subsequent tables.

(b) Producing process (1) Water- and oil-repellent compositions Nos. 1 to 9

The fluorine-containing polymer, PLOS and a solvent were mixed and stirred at room temperature for 10 minutes, producing each of water- and oil-repellent compositions Nos. 1 to 7. Water- and oil-repellent compositions Nos. 8 and 9 were prepared by condensing the fluorine-containing polymer with PLOS in the presence of catalyst.

(c) Conventional mold release agents

Table 2 below shows conventional mold release agents used for comparison.

TABLE 2

| WOR No. | F-Comp. Kind No. | Amount % | PLOS Kind No. | Amount % | Solvent % |
|---|---|---|---|---|---|
| 10 | (1) | 100 | | | IPA 5<br>S-3 95 |
| 11 | (2) | 100 | | | IPA 5<br>S-3 95 |
| 12 | (3) | 100 | | | IPA 5<br>S-3 95 |
| 13 | (4) | 100 | | | Acetone 10<br>S-3 90 |
| 14 | | | (5) | 100 | IPA 5<br>S-3 95 |
| 15 | | | (6) | 100 | IPA 5<br>S-3 95 |

3. Performance test

Each piece of tetorontropical fabric and nylontaffeta fabric and treated with each of the water- and oil-repellent compositions Nos. 1 to 9 obtained above (Examples 1 to 9) and conventional water- and oil-repellent compositions Nos. 10 to 15 obtained above (Comparison Examples 10 to 15) was tested for the water- and oil-repellency, resistance to dry soil and resistance to washing. Table 6 below shows the test results. The treatment and the tests were carried out by the following methods.

(1) Treatment

The water- and oil-repellent composition of the formulation as shown above in Table 1 was dissolved in the solvent of the composition as indicated above in Table 1 to give a solution having a concentration of 0.5%. The test fabric piece (30 cm×30 cm) was immersed in the solution thus obtained, squeezed with a mangle (squeezed at a rate of 50%) and dried at room temperature for 2 hours.

(2) Test for water- and oil-repellency

The water repellency of the fabric pieces was evaluated according to the ratings indicated in the spraying method of JIS L-1092 (see Table 3 below). The oil repellency of the test fabric pieces was evaluated according to the permeation degree obtained 30 seconds after drops (4 mm in diameter) of each test solution as shown below in Table 4 were let fall onto two positions of each test fabric piece (AATCC TM 118-1966).

TABLE 3

| Rating | Degree of water repellecy |
|---|---|
| 100 | No wetting of the surface |
| 90 | Small wetting of the surface |
| 80 | Visible wetting of the surface |
| 70 | Partial wetting of the surface |
| 50 | Fulll wetting of the surface |
| 0 | Complete wetting of the surface |

TABLE 4

| Oil-repellency | (AATCC TM118-1966) Test solution | Surface tention dyne/cm at 25° C. |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | a mixture solvent of n-hexane and Nujol (35:65) | 29.6 |
| 1 | Nujol | 31.2 |
| 0 | less than 1 | |

(3) Test for resistance to dry soil

The fabric was cut into a piece measuring 5 cm×7 cm. The test fabric piece thus obtained was placed into a container containing the test dry soil as shown below in Table 5 (in an amount corresponding to double the weight of the test fabric piece). The test fabric piece were mixed and vigorously stirred for 3 minutes to induce contamination. After contamination, the excess soil was removed by an electric cleaner and the reflectivity was measured to evaluate the degree of contamination, which was given by the following equation.

Contamination degree (%)=(RO−R/RO)×100 wherein RO is the reflectivity of unsoiled portion of the test fabric piece and R is the reflectivity of the soiled portion thereof.

TABLE 5

| Material | wt. % |
|---|---|
| Peat moss | 38 |
| Cement | 17 |
| Kaolin clay | 17 |
| Silica | 17 |

TABLE 5-continued

| Material | wt. % |
|---|---|
| Furnace black | 1.75 |
| Rediron oxide | 0.50 |
| Mineral oil (white) | 8.75 |

(4) Test for resistance to washing

The resistance to washing was determined by performing 5 and 20 laundry cycles, one laundry cycle consisting of laundry using 2 g/l (bath ratio=1:3) of a commercially available detergent (trade name "ZABU," ZABU enzyme, product of Kao Co., Ltd.) in an home laundry machine for household use, followed by first centrifugal dehydration, first 2-minute washing with water, second centrifugal dehydration, second 2-minute washing with water and third centrifugal dehydration, all at 0.40° C. for 5 minutes. Thereafter the laundry was dried by hot air at 80° C. for 3 minutes to determine the water- and oil-repellency (household washing in JIS L. 0217-76 103).

TABLE 6

Water- and oil-repellency and resistance to washing

| | Tetorontropical fabric | | | | | | Nylontaffeta fabric | | | | Resistance to dry soil |
|---|---|---|---|---|---|---|---|---|---|---|---|
| | Before laundry | | 5 Cycles of laundry | | 20 Cycles of laundry | | Before laundry | | 5 Cycles of laundry | | Nylontaffeta fabric Contamination degree |
| | W.R. | O.R. | W.R. | O.R. | W.R. | O.R. | W.R. | O.R. | W.R. | O.R. | (%) |
| 1 | 100 | 7 | 100 | 6 | 70 | 4 | 100 | 6 | 80 | 2 | 12 |
| 2 | 100 | 5 | 80 | 4 | 70 | 2 | 100 | 5 | 50 | 1 | 18 |
| 3 | 100 | 4 | 80 | 3 | 70 | 1 | 100 | 5 | 80 | 1 | 21 |
| 4 | 80 | 5 | 50 | 2 | 50 | 1 | 80 | 5 | 50 | 0 | 25 |
| 5 | 100 | 6 | 80 | 4 | 70 | 4 | 100 | 4 | 100 | 1 | 12 |
| 6 | 100 | 7 | 100 | 7 | 70 | 4 | 100 | 6 | 70 | 2 | 10 |
| 7 | 100 | 5 | 100 | 5 | 50 | 4 | 100 | 6 | 70 | 1 | 15 |
| 8 | 100 | 8 | 90 | 7 | 70 | 4 | 100 | 8 | 90 | 3 | 8 |
| 9 | 100 | 7 | 80 | 5 | 70 | 4 | 100 | 6 | 80 | 2 | 10 |
| 10 | 100 | 7 | 100 | 6 | 50 | 3 | 100 | 6 | 50 | 0 | 17 |
| 11 | 100 | 5 | 70 | 3 | 50 | 0 | 100 | 5 | 0 | 0 | 25 |
| 12 | 100 | 4 | 80 | 0 | 50 | 0 | 100 | 5 | 0 | 0 | 30 |
| 13 | 80 | 6 | 70 | 3 | 50 | 2 | 100 | 6 | 70 | 0 | 38 |
| 14 | 0 | 0 | 0 | 0 | 0 | 0 | 50 | 0 | 0 | 0 | 60 |
| 15 | 0 | 0 | 0 | 0 | 0 | 0 | 70 | 0 | 0 | 0 | 45 |

*W.R.: Water-repellency
O.R.: Oil-repellency

The results obtained above show that the water- and oil-repellent compositions of the present invention are superior in soil resistance and in water- and oil-repellency than conventional water- and oil-repellent compositions.

We claim:

1. A water- and oil-repellent composition comprising (A) at least one species selected from the group consisting of a homopolymer and a copolymer of perfluoroalkyl group containing acrylate, a homopolymer and a copolymer of perfluoroalkyl group containing methacrylate, a copolymer of said acrylate or methacrylate and other monomer copolymerizable therewith provided that said monomer cannot be said acrylate or methacrylate, and a perfluoroalkyl group-containing urethane compound represented by the formulas (3) to (6):

  (3)

  (4)

  (5)

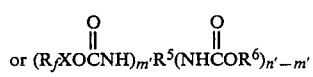  (6)

wherein $R_f$ is perfluoroalkyl group having 4 to 20 carbon atoms, X is $-CH_2CH(A)C_jH_{2j}-$, $C_kH_{2k}-$ or $-SO_2N(R^7)C_tH_{2t}-$ wherein A is hydrogen, lower alkyl, hydroxyl or lower alkylcarbonyloxy, j is an integer to 0 to 4, k and t are an integer of 1 to 4 and $R^7$ is hydrogen or lower alkyl, Y is a bivalent organic group, Z is a monovalent organic group and W is a bivalent organic group, $R^5$ in the formula (6) is an organic group, $R^6$ is lower alkyl, n' is an integer of 3 to 10, and m' is an integer in the range of $n' \geq m' \geq 1$, and (B) a ladder polymer of silsesquioxane.

2. A water- and oil-repellent composition according to claim 1 in which component (A) is at least one species selected from the group consisting of a homopolymer and a copolymer or perfluoroalkyl group containing acrylate represented by the formula (1) or (2):

  (1)

  (2)

wherein $R_f$ is perfluoroalkyl group having 4 to 20 carbon atoms, $R^2$ is alkylene group having 1 to 10 carbon atoms or a group $-CH_2CH(OR^3)CH_2-$, $R^3$ is hydrogen atom or alkyl group having 1 to 10 carbon atoms, $R^4$ is alkylene group having 1 to 10 carbon atoms, a homopolymer and a copolymer of perfluoroalkyl group, containing methacrylate represented by the formula (1)' or (2)':

  (1)'

  (2)' wherein $R_f$, $R^2$, $R^3$ and $R^4$ are as defined above, and a copolymer of said acrylate or methacrylate and other monomer copolymerizable therewith provided that said monomer cannot be said acrylate or methacrylate.

3. A water- and oil-repellent composition according to claim 1 in which component (B) is a ladder polymer or silsesquioxane composed of an silsesquioxane represented by the formula:

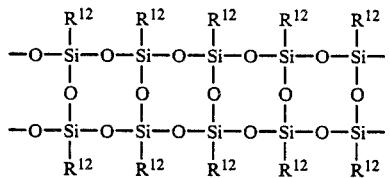

wherein $R^{12}$ is the same or different and represents methyl or phenyl.

4. A water- and oil-repellent composition according to claim 1 in which the weight ratio of the component (A) to the component (B) is about 99.9:0.1 to 0.1:99.9.

5. A water- and oil-repellent composition according to claim 1 in which the weight ratio of the component (A) to the component (B) is about 99.9:0.1 to 30:70.

6. A water- and oil-repellent composition according to claim 1 in which the ladder polymer of organosilsesquioxane is represented by repeating units having the formula:

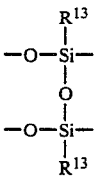

wherein the $R^{13}$ substituents are the same or different and represent hydrogen, alkyl having 1 to 6 carbon atoms, cyclohexyl, alkenyl having 2 to 6 carbon atoms or phenyl, and the polymerization degree of the ladder polymer being between about 2 to about 200 of said units provided that the $R^{13}$ substituents in a single unit are the same but those among other units may not be the same.

7. A water- and oil-repellent composition according to claim 6 in which the ladder polymer of silsesquioxane is a chain-like polymer wherein alkoxy having 1 to 6 carbon atoms, acetoxy, hydroxyl or chlorine atom is linked to the terminal Si, and wherein alkyl having 1 to 6 carbon atoms, acetyl or hydrogen is linked to the terminal O, or the terminal O is substituted with chlorine atom in corresponding relationship with the terminal Si.

* * * * *